US009343986B2

(12) United States Patent
Kimura et al.

(10) Patent No.: US 9,343,986 B2
(45) Date of Patent: May 17, 2016

(54) POWER CONVERTER WITH CURRENT FEEDBACK LOOP

(71) Applicants: DENSO CORPORATION, Kariya, Aichi-pref. (JP); NIPPON SOKEN, INC., Nishio, Aichi-pref. (JP)

(72) Inventors: Norihito Kimura, Hekinan (JP); Hideki Itou, Toyokawa (JP); Yuji Hayashi, Kasugai (JP)

(73) Assignees: DENSO CORPORATION, Kariya (JP); NIPPON SOKEN, INC., Nishio (JP)

( * ) Notice: Subject to any disclaimer, the term of this patent is extended or adjusted under 35 U.S.C. 154(b) by 75 days.

(21) Appl. No.: 14/156,851

(22) Filed: Jan. 16, 2014

(65) Prior Publication Data

US 2014/0198538 A1     Jul. 17, 2014

(30) Foreign Application Priority Data

Jan. 16, 2013   (JP) .................................. 2013-005290

(51) Int. Cl.
H02M 3/335        (2006.01)
H02M 3/337        (2006.01)

(52) U.S. Cl.
CPC ........ *H02M 3/3376* (2013.01); *H02M 3/33507* (2013.01)

(58) Field of Classification Search
CPC ............. H02M 2001/0016; H02M 2001/0025; H02M 2001/0032; H02M 3/33507; H02M 3/33523; H02M 3/28; H02M 3/3376; H02M 3/36

USPC .................................. 363/21.01, 21.04–21.18
See application file for complete search history.

(56) References Cited

U.S. PATENT DOCUMENTS

| | | | | |
|---|---|---|---|---|
| 5,060,131 A | * | 10/1991 | Sikora ............... | H02M 3/33507 363/21.09 |
| 2002/0135345 A1 | | 9/2002 | Terashi | |
| 2005/0068001 A1 | * | 3/2005 | Skaug ..................... | F04C 28/08 318/807 |
| 2010/0052640 A1 | * | 3/2010 | Ryoo ............................. | 323/288 |

FOREIGN PATENT DOCUMENTS

| | | |
|---|---|---|
| JP | 2002-281742 | 9/2002 |
| JP | 2005-287264 | 10/2005 |

* cited by examiner

*Primary Examiner* — Yemane Mehari
(74) *Attorney, Agent, or Firm* — Nixon & Vanderhye PC

(57) ABSTRACT

In a power converter, a driver drives a switching element using a manipulated variable therefor to convert input power into output power. A first measuring unit measures a value of a first electric parameter depending on the input power. A first determiner determines, from the measured value of the first electric parameter, a first feedback controlled variable. A second measuring unit measures a value of a second electric parameter indicative of the output power, and a calculator calculates, based on the measured value of the second electric parameter and a command value for the second electric parameter, a second feedback controlled variable. A selector selects, based on the measured value of the first electric parameter, one of the first feedback controlled variable and the second feedback controlled variable. A second determiner determines the manipulated variable using the selected one of the first and second feedback controlled variables.

10 Claims, 8 Drawing Sheets

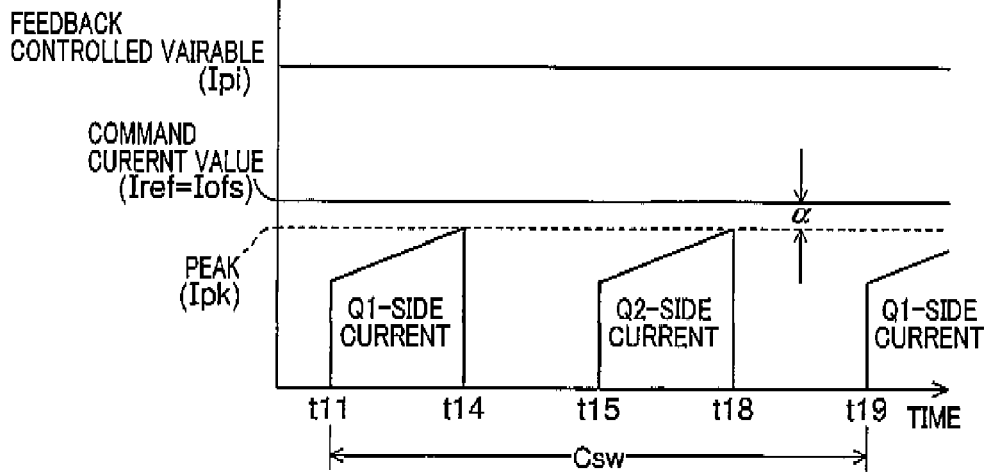
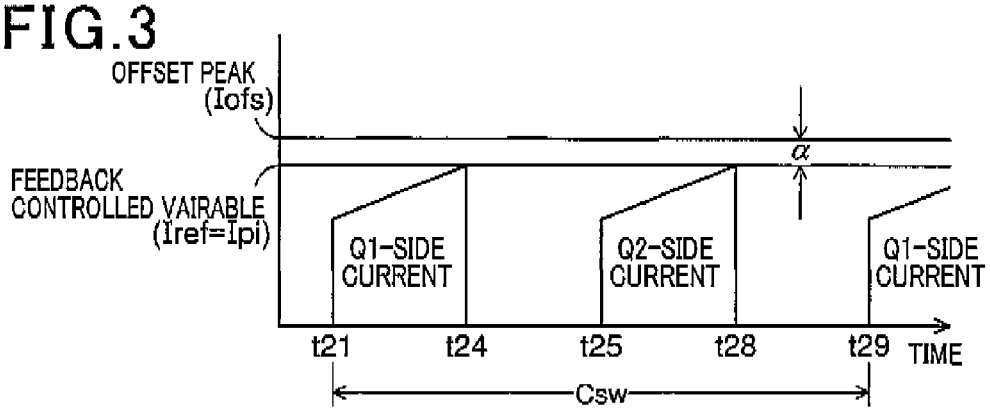
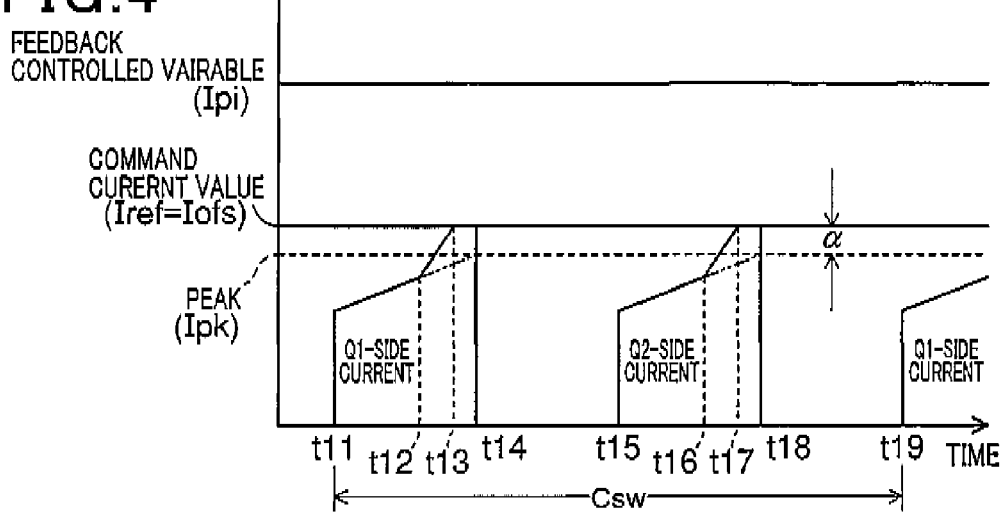

POWER CONVERTER WITH CURRENT FEEDBACK LOOP

CROSS REFERENCE TO RELATED APPLICATIONS

This application is based on and claims the benefit of priority from Japanese Patent Application 2013-005290 filed on Jan. 16, 2013, the disclosure of which is incorporated in its entirety herein by reference.

TECHNICAL FIELD

The present disclosure relates to power converters having a current feedback loop.

BACKGROUND

DC-DC converters, as an example of power converters, are often used in electronic devices, electronic systems, and the like. DC-DC converters normally use switching elements and an inductor, such as a transformer, and perform on-off control of the switching elements to convert, via the switching elements and inductor, input DC power into output DC power different from the input DC power.

Such DC-DC converters perform feedback control that measures a value of the output DC power via a feedback loop, and compares a command value for the output DC power with the measured value of the output DC power, thus determining a manipulated variable for each of the switching elements based on results of the comparison.

These DC-DC converters are classified broadly into voltage-mode control DC-DC converters and current-mode control DC-DC converters. A voltage-mode control DC-DC converter is designed to perform on-off control of the switching elements using a voltage feedback loop of its output voltage. In contrast, a current-mode DC-DC converter is designed to perform on-off control of the switching elements using the combination of the voltage feedback loop and a current feedback loop of a current flowing through the inductor as an inductor current.

In these current-mode DC-DC converters, there have been disclosed some technologies for reducing the variation in the output voltage even when the output current flowing through a load rapidly changes. One example of these technologies is disclosed in Japanese Patent Application Publication No. 2002-281742.

The current-mode DC-DC converter disclosed in the Patent Publication measures a value of an inductor current flowing through the inductor using the current feedback loop. Then, the current-mode control DC-DC converter compares the measured value of the inductor current with a command current value determined based on a command voltage for the output voltage thereof, thus performing on-off control of the switching elements according to results of the comparison. This adjusts the output voltage of the current-mode control DC-DC converter to the command voltage.

Particularly, the current-mode control DC-DC converter disclosed in the Patent Publication is equipped with a feedforward circuit that measures a change in an output current flowing through a load. The feedforward circuit adds the detected change to a corresponding measured value of the inductor current, thus correcting the measured value of the inductor current to follow the change in the output current flowing through the load.

SUMMARY

In the aforementioned feedback control, if the input DC power rapidly varies, the response based on the feedback loop may not follow the rapid variation in the input DC power, resulting in reduction of the accuracy of obtaining a required value of the converted output DC power.

In view of this point, the technology disclosed in the Patent Publication may not address such a problem due to the rapid variation in the input DC power. This is because the technology merely follows the change in the output current flowing through a load of the current-mode control DC-DC converter, and may not consider the rapid variation in the input DC power.

This problem may take place in power converters, which convert input power to output power different therefrom, due to rapid variation in the input power.

In view of the circumstances set forth above, one aspect of the present disclosure seeks to provide power converters, which are capable of solving the problem set forth above.

Specifically, an alternative aspect of the present disclosure aims to provide such power converters which are capable of maintaining, at a high level, the accuracy of obtaining a required value of converted output power thereof even if input power thereto rapidly varies.

According to an exemplary aspect of the present disclosure, there is provided a power converter. The power converter includes a driver that drives a switching element of a switch circuit using a manipulated variable for the switching element to convert input power to the switch circuit into output power of the switch circuit. The power converter includes a first measuring unit that measures a value of a first electric parameter depending on the input power to the switch circuit. The power converter includes a first determiner that determines, from the measured value of the first electric parameter, a first feedback controlled variable. The power converter includes a second measuring unit that measures a value of a second electric parameter indicative of the output power from the switch circuit. The power converter includes a calculator that calculates, based on the measured value of the second electric parameter and a command value for the second electric parameter, a second feedback controlled variable. The power converter includes a selector that selects, based on the measured value of the first electric parameter, one of the first feedback controlled variable and the second feedback controlled variable. The power converter includes a second determiner that determines the manipulated variable for the switching element using the selected one of the first feedback controlled variable and the second feedback controlled variable.

In the exemplary aspect of the present disclosure, even if the input power rapidly varies so that the second feedback controlled variable may not follow the rapid variation, the selector detects the rapid variation of the input power on the basis of the first electric parameter depending on the input power, thus selecting the first feedback controlled variable that should be used to determine the manipulated variable for the switching element. Because the first feedback controlled variable is determined based on the first electric parameter depending on the input power, the first feedback controlled variable reliably follows the rapid variation of the input power. Thus, it is possible to maintain, at a high level, the accuracy of obtaining a required value of converted output power even if the input power rapidly varies.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of embodiments with reference to the accompanying drawings in which:

FIG. 2 is a liming chart schematically illustrating an example of how each of a Q1-side current and a Q2-side current varies when a feedback controlled variable is higher than an offset peak in a steady state of an input voltage to the power converter;

FIG. 3 is a timing chart schematically illustrating an example of how each of the Q1-side current and the Q2-side current varies when the feedback controlled variable is equal to or lower than the offset peak in the steady state of the input voltage to the power converter;

FIG. 4 is a timing chart schematically illustrating another example of how each of the Q1-side current and Q2-side current varies when the feedback controlled variable is higher than the offset peak in an unsteady state of the input voltage;

DETAILED DESCRIPTION OF EMBODIMENT

Embodiments of the present disclosure will be described hereinafter with reference to the accompanying drawings. In the embodiments, the phrase "A is/are connected to B" or the similar expressions represents that. A is/are electrically connected to B unless otherwise is described. In each of the drawings, there are disclosed elements at least required to describe an allocated part of the present disclosure.

First Embodiment

Figure 1:
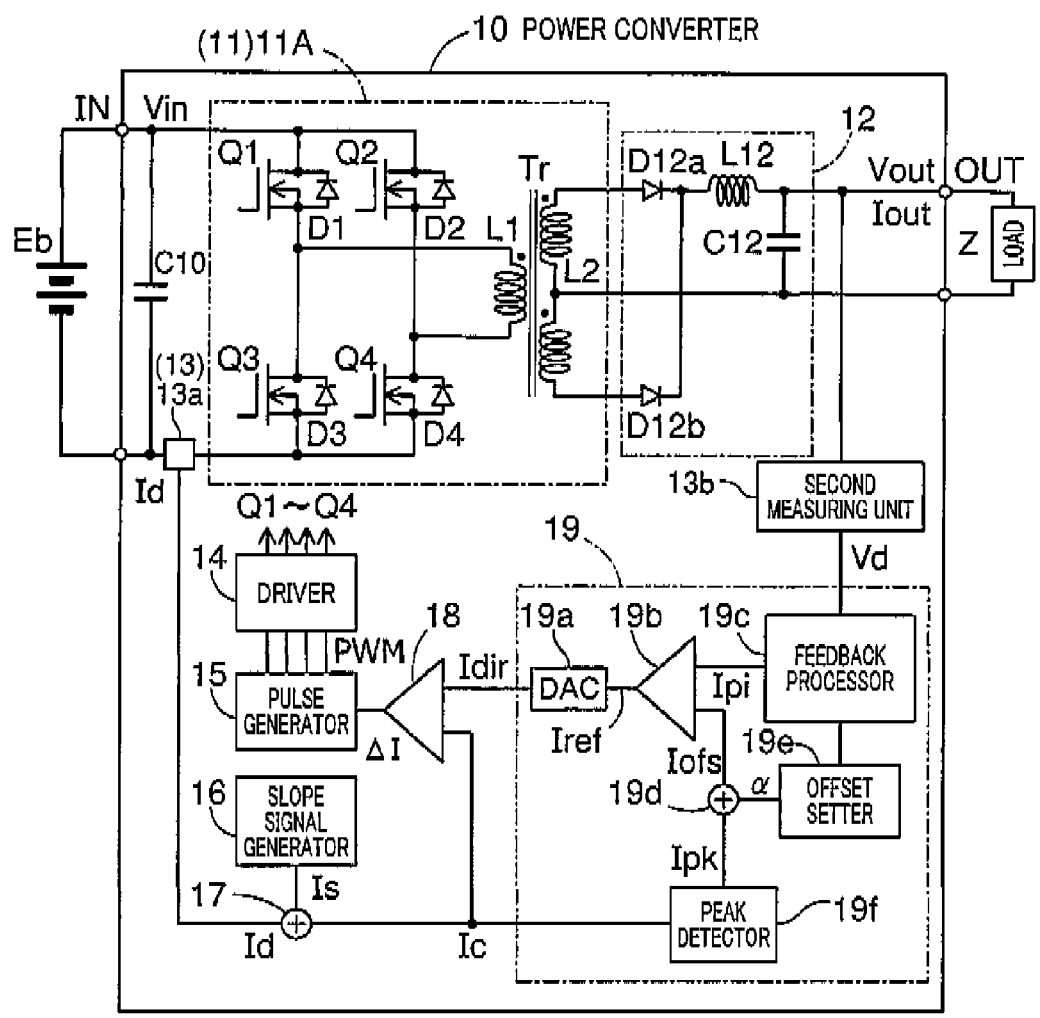
FIG. 1 is a circuit diagram schematically illustrating an example of the overall configuration of a power converter according to a first embodiment of the present disclosure.

Referring to FIG. 1, there is illustrated a power converter 10, in other words, a switching power supply, according to a first embodiment of the present disclosure; the switching power supply is an example of power converters according to the present disclosure.

The power converter 10 is operative to convert a variable input DC voltage yin of, for example, 288 V, as an example of input power, into a required output voltage of for example, 14 V, as an example of output power. That is, the power converter 10 has a wide dynamic range of voltage conversion.

The power converter 10 has input terminals, i.e. positive and negative input terminals, IN to which a DC power source Eb is connected, and has output terminals, i.e. positive and negative output terminals, OUT to which a load Z is connected. As the DC power source Eb, a battery, such as a secondary battery, a fuel cell, or the like, can be used. As the load Z, a DC battery having a predetermined capacity different from that of the DC power source Eb can be used. As the load Z, a rotary machine, such as an electric power generator, a power generator, a motor, or the like, a head lump, or the like can also be used.

The power converter 10 includes a capacitor C10, a switch circuit 11A, a rectifying and smoothing circuit 12, and a first measuring unit 13a. The power converter 10 also includes a driver 14, a pulse generator 15, a slope-signal generator 16, a signal processor 17, a signal comparator 18, a feedback unit 19, and a second measuring unit 13b. These elements of the power converter 10 will be described hereinafter. Note that each element of the power converter 10 is designed to process, unless otherwise is described, at least one of various signals, which are communicated in the power converter 10, in a predetermined form, that the element can handle. For example, each element of the power converters 10 is designed to process at least one of these various signals in an analog form or a digital form. These various signals include, as described later, a measured current value Id and a measured voltage value Vd.

The capacitor C10 has a first end connected to the positive input terminal IN, and a second end, which is opposite to the first end, connected to the negative input terminal IN. That is, the capacitor C10 is connected in parallel to the DC power source Eb, and is operative to smooth the input voltage Vin input thereto from the DC power source Eb.

The switch circuit 11A is comprised of series-connected switching elements Q1 and Q3, series-connected switching elements Q2 and Q4, diodes D1 to D4, and a transformer Tr. For example, as the switching elements Q1 to Q4, IGBTs or power MOSFETs can be respectively used.

Each of the switching elements Q1 to Q4 has a first terminal, a second terminal, and a conductive path formed therebetween. The first terminal of the switching element Q1 is connected to the positive input terminal IN via a positive DC input line. The second terminal of the switching element Q1 is connected to the first terminal of the switching element Q3 to constitute the series-connected switching elements Q1 and Q3. The second terminal of the switching element Q3 is connected to the negative input terminal IN via a negative DC input line.

Similarly, the first terminal of the switching element Q2 is connected to the positive input terminal IN via the positive DC input line. The second terminal of the switching element Q2 is connected to the first terminal of the switching element Q4 to constitute the series-connected switching elements Q2 and Q4. The second terminal of the switching element Q4 is connected to the negative input terminal IN via the negative DC input line. For example, if power MOSFETs are used as the switching elements Q1 to Q4, the drain of each of the switching elements Q1 to Q4 serves as the first terminal, and the source serves as the second terminal.

With the configuration, the switching elements Q1 and Q2 will also be referred to as high-side switching elements, and the switching elements Q3 and Q4 will also be referred to as low-side switching elements.

Each of the diodes D1 to D4 is connected between the first end and second end of a corresponding one of the switching elements Q1 to Q4 in antiparallel thereto, and serves as a free-wheel diode.

If power MOSFETs are used as the switching elements Q1 to Q4, intrinsic diodes of the power MOSFETs can be used as the free-wheel diodes, thus eliminating the free-wheel diodes.

The series-connected switching elements Q1 and Q3 and the series-connected switching elements Q2 and Q4 are parallelly connected to each other in bridge configuration.

Each of the switching elements Q1 to Q4 has a control terminal connected to the driver 14. If power MOSFETs are used as the switching elements Q1 to Q4, the gate of each of the switching elements Q1 to Q4 serves as the control terminal thereof. As described later, a drive signal sent from the driver 14 and input to the control terminal of each of the switching elements Q1 to Q4 opens or closes the conductive path thereof, that is, turns on or off the corresponding switching element.

In the first embodiment, the driver 14 is designed to complementarily turn on the high- and low-side switching elements Q1 and Q3. Similarly, the driver 14 is designed to complementarily turn on the high- and low-side switching elements Q2 and Q4. In addition, the driver 14 is designed to alternately turn on a first set of high- and low-side switching elements Q1 and Q4 and a second set of high- and low-side switching elements Q2 and Q3. These operations of the driver 14 permit the switch circuit 11A to serve as an inverter that converts DC power, that is, the DC voltage Vin, input to the switch circuit 11A from the DC power source Eb into AC power, that is, an AC voltage, and applies the AC power to the transformer Tr.

The transformer Tr, which serves as an inductor, is comprised of a primary winding L1 and a secondary winding L2 having a center tap and magnetically coupled to the primary winding L1. The rectifying and smoothing circuit 12 is comprised of a first diode D12a, a second diode 12b, a capacitor C12, and a coil L12. A connecting point between the second end of the switching element Q1 and the first end of the switching element Q3 is connected to one end of the primary winding L1. A connecting point between the second end of the switching element Q2 and the first end of the switching element Q4 is connected to the other end of the primary winding L1.

The secondary winding L2 also has a first end and a second end opposite thereto. The first end of the secondary winding L2 is connected to the anode of the first diode 12a, and the second end thereof is connected to the anode of the second diode 12b. The center tap of the secondary winding L2 is connected to the negative output terminal OUT. The center tap divides the secondary winding L2 into a first winding portion and a second winding portion. The turns ratio representing the number of turns of each of the first and second winding portions of the secondary winding L2 to the number of turns of the primary winding L1 is set to a predetermined value.

The transformer Tr is operative to convert the AC voltage applied to the primary winding L1, in other words, induced through the primary winding L1, into a different AC voltage induced in the secondary winding L2 while the primary winding L1 is electrically isolated from the secondary winding L2; the magnitude of the AC voltage induced across the secondary winding L2 is determined based on the turns ratio.

The cathode of the first diode 12a and the cathode of the second diode 12b are commonly connected to one end of the coil L12. The other end of the coil L12 is connected to the positive output terminal OUT. The capacitor C12 is connected between the coil L12 and the load Z to be in parallel to the load Z.

Specifically, the first and second diodes 12a and 12b constitute a full-wave rectifier that full-wave rectifies the AC voltage induced across the secondary winding L2, thus generating a DC voltage. The coil L12 and the capacitor C12 constitute an LC filter configured to smooth the DC voltage output from the full-wave rectifier, thus generating an output voltage Vout across the positive and negative output terminals OUT to be supplied to the load Z.

The other end of the coil L12, which is connected to the positive output terminal OUT of the power converter 10, is also connected to the second measuring unit 13b.

The second measuring unit 13b is operative to measure a value Vd of the output voltage Vout in an analog format. The value Vd of the output voltage Vout, serving as, for example, a measured value of a second electric parameter according to the present disclosure, is changed depending on the conditions of the load Z and the like. The second measuring unit 13b is also operative to output the measured value Vd of the output voltage Vout to the feedback unit 19.

The first measuring unit 13a is provided in the negative DC input line, and is connected between the second end of the capacitor C10 and the second end of the switching element Q3. The first measuring unit 13a is operative to measure a value Id of current input from the DC power source Eb to the switch circuit 11A in the analog format; this current will be referred to as an input current. In the first embodiment, control of switching of the switching elements Q1 to Q4 permits the measured input-current value Id to vary in a given wave form, that is, a pulse wave form.

The pulse generator 15 is connected to the signal comparator 18 and to the driver 14. The pulse generator 15 is operative to generate, based on a current deviation ΔI supplied from the signal, comparator 18 described later, PWM signals for the respective switching elements Q1 to Q4. For example, the pulse generator 15 is operative to generate the PWM signals for the respective switching elements Q1 to Q4 such that the current deviation ΔI becomes zero.

Each of the PWM signals for a corresponding one of the switching elements Q1 to Q4 consists of a train of pulses having a predetermined duty, i.e. a duty factor, for each predetermined switching cycle. The duty factor represents a controllable on-pulse width for each predetermined switching cycle. In other words, the duty factor represents a predetermined ratio, i.e. percentage, of on duration to the total duration of each predetermined switching cycle.

The combination of the pulse generator 15 and the signal comparator 18 serves as, for example, the second determiner according to the present disclosure.

The driver 14 is operative to amplify the PWM signals for the respective switching elements Q1 to Q4, and outputs the amplified PWM signals to the control terminals of the respective switching elements Q1 to Q4, thus individually driving, i.e. turning on or off, the switching elements Q1 to Q4.

The slope-signal generator 16 is connected to the signal processor 16 and is operative to generate a slope signal Is for gradually increasing or decreasing the measured input-current value Id. In the first embodiment, the slope signal has a configuration that periodically increases or decreases with a predetermined slope like a saw-tooth wave. As illustrated in FIGS. 2 to 6 described later, an input current flowing through the primary winding L1 based on the drive of the switching elements Q1 to Q4 increases with time due to the characteristic of the primary winding L1. For example, the slope signal Is serves to compensate the slope of the input current to a suitable slope. The slope-signal generator 16 is also operative to output the slope signal Is to the signal processor 17.

The signal processor 17 is connected to the first measuring module 13a. The signal processor 17 is operative to calculate the sum of the slope signal Is and the measured input-current value Id to generate a value of composite current signal Ic serving as, for example, a measured value of a first electric parameter, thus outputting the value of the composite current signal Ic to the feedback unit 19 and the comparator 18.

The comparator 18 has first and second input terminals and an output terminal. The first input terminal is connected to the feedback unit 19, the second terminal is connected to the signal processor 17, and the output terminal is connected to the pulse generator 15. The comparator 18 is operative to compare a value of the composite current signal Ic with a command current value Idir sent from the feedback unit 19 as a reference value, thus calculating the current deviation ΔI between the value of the composite current signal Ic and the command current value Idir. The comparator 18 is also operative to supply the current deviation ΔI to the pulse generator 15.

The feedback unit 19 is for example comprised of a digital-analog converter (DAC) 19a, a minimum-value selector 19b, a feedback processor 19c, a signal processor 19d, an offset setter 19e, and a peak detector 19f. Note that the feedback unit 19 can be configured as a programmed logic unit, such as a computer, a hard-wired logic unit, or the combination of hardwired-logic and programmed-logic hybrid units. That is, the functional blocks of the feedback unit 19 can be designed as hardware modules, software modules, or the combinations of hardware and software modules.

The feedback unit 19 is operative to perform feedback control of the output voltage Vout of the power converter 10 relative to a target voltage value Vtag for each predetermined switching cycle Csw. In the first embodiment, the predetermined switching cycle Csw represents a period required for all the switching elements Q1 to Q4 to be switched from one state (on or off state) to the other state.

Note that the feedback unit 19 is configured to usually carry out processes of signals supplied thereto in a digital format when the signals are in the analog format. However, the feedback unit 19 can be configured to carry out processes of signals supplied thereto in the analog format.

For each predetermined switching cycle Csw, the feedback processor 19c, serving as, for example, a calculator according to the present disclosure, is operative to perform:

calculation of a difference Δ between the measured value Vd of the output voltage Vout and the target voltage value Vtag; and calculation of a feedback controlled variable Ipi for the input current using the sum of a proportional gain term and an integral gain term of a PI feedback control algorithm (PI algorithm) using the difference Δ as its input.

In the PI algorithm, the feedback controlled variable is expressed based on the proportional gain term and the integral gain term.

The proportional gain term for the feedback controlled variable contributes to change in the feedback controlled variable in proportion to the difference Δ. The integral gain term is proportional to an accumulated offset of instantaneous values of the difference Δ over time to reset the accumulated offset (steady-state deviation) over time to zero. Note that the feedback processor 19c can calculate a feedback controlled variable Ipi using the sum of a proportional gain term, an integral gain term, and a derivative gain term of a known PID feedback control algorithm (PID algorithm) using the difference Δ as its input. The derivative term is proportional to a difference between a previous value of the difference Δ and a present value thereof to improve response of the feedback controlled variable to suppress fluctuations in the difference Δ.

Note that the target voltage value Vtag can be for example set to a value required for the load Z. The power converter 10 can be provided with a unit for setting the target voltage value Vtag, or can be designed to set the target voltage value Vtag based on signals and/or data supplied from an external unit, such as an external ECU or an external computer.

For each predetermined switching cycle Csw, the peak detector 19f is operative to:

measure a peak Ipk of the composite current signal Ic in the analog format supplied from the signal processor 17;

convert the peak Ipk of the composite current signal Ic in the analog format into that in the digital format; and output the peak Ipk of the composite current signal Ic to the signal processor 19d.

Note that, the first measuring unit 13a and the peak detector 19f serve as for example, a first measuring unit according to the present disclosure.

As described above, the driver 14 is designed to alternately turn on a first set of high- and low-side switching elements Q1 and Q4 and a second set of high- and low-side switching elements Q2 and Q3. The switching cycle Csw therefore consists of a first cycle for turning on the first set of high- and low-side switching elements Q1 and Q4, and a second cycle for turning on the second set of high- and low-side switching elements Q2 and Q3 (see FIGS. 2 and 3 described later). Based on the structure of the switching cycle Csw, the peak detector 19f can be operative to measure, for each of the first and second cycles of the predetermined switching cycle Csw, a peak Ipk of the composite current signal Ic supplied from the signal processor 17.

In this example, the peak detector 19f selects the peak Ipk measured at the first cycle when the first set of high- and low-side switching elements Q1 and Q4 should be driven, and that measured at the second cycle when the second set of high- and low-side switching elements Q2 and Q3 should be driven. As another example, the peak detector 19f can be operative to measure, for each predetermined switching cycle Csw, one of a first peak Ipk1 and a second peak Ipk2 of the composite current signal Ic as the peak Ipk. The first and second peaks Ipk1 and Ipk2 are measured at the respective first and second cycles. For example, the peak detector 19f can be operative to measure, for each predetermined switching cycle Csw, one of the first peak Ipk1 and the second peak Ipk2, which is higher or lower than the other. As a further example, the peak detector 19f can be operative to measure, for each predetermined switching cycle Csw, an average value of the first peak Ipk1 and the second peak Ipk2 of the composite current signal Ic as the peak Ipk.

The offset setter 19e is operative to set an offset current value α.

The signal processor 19d is operative to calculate, for each predetermined switching cycle Csw, the sum of the peak Ipk of the composite current signal Ic and the offset current value α, thus outputting the sum as an offset peak Iofs to the minimum-value selector 19b. Note that the signal processor 19d is configured to:

determine, for each switching cycle Csw, the sum of the peak Ipk and the offset current value α; and output, for each switching cycle Csw, the sum as an offset peak Iofs in the present N-th cycle to the minimum-value selector 19b.

The combination of the offset setter 19e and the signal processor 19d serve as, for example, a first determiner according to the present disclosure.

The minimum-value selector 19b, serving as, for example, a comparator according to the present disclosure, is operative to:

compare, for each predetermined switching cycle Csw, the value of the feedback controlled variable Ipi for the input current and the offset peak Iofs; and select, for each predetermined switching cycle Csw, one of the value of the feedback controlled variable Ipi for the input current and the offset peak Iofs; one of the value of the feedback controlled variable Ipi for the input current is, for example, lower than the offset peak Iofs.

That is, the feedback controlled variable Ipi serves as, for example, a first feedback controlled variable according to the present disclosure, and the offset peak Iofs serves as, for example, a second feedback controlled variable.

Then, the minimum-value selector 19b is operative to output, for each predetermined switching cycle Csw, the selected one of the value of the feedback controlled variable Ipi for the input current and the offset peak Iofs to the DAC 19a as a command current value Iref.

Specifically, the offset current value α serves to determine the command current value Iref directly based on the measured input-current value Id. The offset current value α is determined such that the offset peak Iofs is close to the peak Ipk of the composite current signal Ic.

For each predetermined cycle Csw, the DAC 19a is operative to convert the command current value Iref into a command current value Idir in the analog format, and output the command current value Idir in the analog format to the signal comparator 18.

Thus, as described above, the comparator 18 is operative to compare, for each predetermined switching cycle Csw, the value of the composite current signal Ic with the command current value Idir sent from the feedback unit 19, thus calculating the current deviation ΔI between the value of the composite current signal Ic and the command current value Idir. The comparator 18 is also operative to supply, for each predetermined switching cycle Csw, the current deviation ΔI to the pulse generator 15.

For each predetermined switching cycle Csw, the pulse generator 15 generates, based on the current deviation ΔI supplied from the signal comparator 18, PWM signals for the respective switching elements Q1 to Q4; each of the PWM signals has a predetermined duty factor as a manipulated variable. The PWM signals are sent, for each switching cycle Csw, to the respective switching elements Q1 to Q4 via the driver 14, so that the switching elements Q1 to Q4 are individually driven for each switching cycle Csw to reduce the current deviation ΔI, more specifically, to zero it. This adjusts the value Vd of the output voltage Vout to be equal to the target voltage value Vtag.

The power converter 10 is designed to perform the feedback control of the output voltage Vout of the power converter 10 for each predetermined switching cycle Csw to increase the output voltage Vout so as to be matched with the target voltage value Vtag. In other words, the power converter 10 is normally designed to perform the feedback control of the input current Id to the switch circuit 11A for each predetermined switching cycle Csw to increase the input current Id so as to be matched with the command current value Idir determined based on the target voltage value Vtag, thus matching the output voltage Vout with the target voltage value Vtag.

As described above, the power converter 10 uses, as the combination of a voltage feedback loop and a current feedback loop, the combination of the second measuring unit 13b, the feedback processor 19c, the offset setter 19e, the peak detector 19f, the minimum-value selector 19b, the DAC 19a, the signal comparator 18, the first measuring unit 13a, the signal processor 17, and so on. Thus, the power converter 10 is configured as a current-mode control DC-DC converter.

Next, operations of the feedback unit 19 of the power converter 10 for driving the switching element Q1 to Q4 will be described in more detail with reference to FIGS. 2 to 5.

Note that, as described above, the driver 14 is designed to complementarily turn on the high- and low-side switching elements Q1 and Q3. Similarly, the driver 14 is designed to complementarily turn on the high- and low-side switching elements Q2 and Q4. In addition, the driver 14 is designed to alternately turn on the first set of high- and low-side switching elements Q1 and Q4 and the second set of high- and low-side switching elements Q2 and Q3. Hereinafter, an input current flowing through the switching elements Q1 and Q4 and the primary winding L1 when the switching elements Q1 and Q4 are simultaneously on will be referred to as a Q1-side current. Similarly, an input current flowing through the switching elements Q2 and Q3 and the primary winding L1 when the switching elements Q2 and Q3 are simultaneously on will be referred to as a Q2-side current.

FIG. 2 schematically illustrates an example of how an input current to the switch circuit 11A varies under the feedback control set forth above when the feedback controlled variable Ipi for the input current to the power converter 10 is higher than the offset peak Iofs in a steady state of the input voltage Vin, which is expressed as: Ipi>Iofs.

As illustrated in FIG. 2, the driver 14 simultaneously turns on both the switching elements Q1 and Q4 at time t11, and continues the on state of the switching elements Q1 and Q4 up to time t14. At the time t14, the switching elements Q1 and Q4 are switched off. During the period from the time t11 to the time t14, the switching elements Q2 and Q3 are kept off.

After lapse of a predetermined dead time from the time t14, the driver 14 simultaneously turns on both the switching elements Q2 and Q3 at time t15, and continues the on state of the switching elements Q2 and Q3 up to time t18. During the period from the time t15 to the time t18, the switching elements Q1 and Q4 are kept off.

After lapse of, for example, the same dead time, the driver 14 simultaneously turns on both the switching elements Q1 and Q4 at time t19. That is the driver 14 repeats the alternate drive of the first set of switching elements Q1 and Q4 and the second set of switching elements Q2 and Q4 set forth above. In FIG. 2, the switching cycle Csw is expressed as the period from the time t11 to the time t19. The dead time, i.e. the time delay, between turn-on of the switching elements Q1 and Q4 and that of the switching elements Q2 and Q3 serves to prevent a short-circuit between the series-connected switching elements Q1 and Q3, or between the series-connected switching elements Q2 and Q4.

In the first embodiment, the slope of each of the Q1-side current and the Q2-side current is compensated based on the slope signal Is.

FIG. 3 schematically illustrates an example of how each of the Q1-side current and Q2-side current varies under the feedback control set forth above when the feedback controlled variable Ipi for the input current to the power converter 10 is equal to or lower than the offset peak Iofs in the steady state of the input voltage Vin, which is expressed as: Ipi≤Iofs. The drive timings of the switching elements Q1 to Q4 illustrated in FIG. 3 are substantially identical to those illustrated in FIG. 2 as long as the times t11, t14, t15, t18, and t19 illustrated in FIG. 2 should be read as times t21, t24, t25, t28, and t29 illustrated in FIG. 3, respectively.

As described above, the input voltage Vin to the power converter 10 is variable. If the input voltage Vin to the power converter 10 is high enough to follow the variation in the target voltage value Vtag, the target voltage value Vtag is not deviated from the input voltage Vin to the power converter 10 very much. This results in the feedback controlled variable Ipi for the input current to the power converter 10 being equal to or lower than the offset peak Iofs. Then, the minimum-value selector 19b selects the feedback controlled variable Ipi for the input current to the power converter 10 as the command current value Iref (see Iref=Ipi in FIG. 3).

As a result, the driver 14, the pulse generator 15, and the signal comparator 18 perform a first current-feedback control mode to compare the feedback controlled variable Ipi for the input current to the power converter 10 with the value of the composite current signal Ic. This drives the switching elements Q1 to Q4 such that the value of the composite current signal Ic based on the measured input-current value Id matches the command current value Iref corresponding to the feedback controlled variable Ipi for the input current to the power converter 10 determined based on the target voltage value Vtag.

However, if the input voltage Vin to the power converter 10 were so low that it could not maintain the target voltage value Vtag, the target voltage value Vtag would deviate from the input voltage Vin to the power converter 10 although the duty factor of each of the switching elements Q1 to Q4 were set to be high. This could cause the value of the composite current signal Ic corresponding to the measured input-current value Id to be deviated from the feedback controlled variable Ipi for the input current to the power converter 10. This might make it difficult to perform current-feedback control using the feedback controlled variable Ipi for the input current.

In view of these circumstances, with the power converter 10 according to the first embodiment, the minimum-value selector 19b selects the value of the offset peak Iofs as the command current value Iref (see Iref=Iofs in FIG. 2). As described above, the offset peak Iofs is the sum of the peak Ipk of the composite current signal Ic and the offset current value α.

As a result, the driver 14, the pulse generator 15, and the signal comparator 18 perform a second current-feedback control mode to compare the offset peak Iofs as the command current value Iref with the value of the composite current signal Ic. This drives the switching elements Q1 to Q4 such that the measured input-current value Id matches the command current value Iref determined based on the offset peak Iofs. Note that, in this second current-feedback mode, the peak detector 19f is configured not to measure or determine a peak Ipk of the composite current signal Ic, so that the previously measured or determined peak Ipk is continuously used by the signal processor 19d.

FIG. 4 schematically illustrates another example of how each of the Q1-side current and Q2-side current varies under the feedback control set forth above when the feedback controlled variable Ipi for the input current to the power converter 10 is higher than the offset peak Iofs in a case where:

the input voltage Vin rapidly varies, that is, rapidly increases from a low level, from time t12 during the on state of the first set of switching elements Q1 and Q4, so that the measured input-current value Id rapidly varies, that is, rapidly increases, from the time t12.

In this case, if the power converter 10 was configured to perform only the first current-feedback control mode based on the feedback controlled variable Ipi, it would be difficult to perform the first current-feedback control mode because the value of the composite current signal Ic corresponding to the measured input-current value Id would be deviated from the feedback controlled variable Ipi. This would make it difficult to follow the rapid variation, i.e. the rapid increase, of the input voltage Vin. This might result in an increase of the voltage applied to the primary winding L1 of the transformer Tr while the duty factor of each of the switching elements Q1 to Q4 is uncontrolled. This might cause the transformer Tr to be magnetically biased due to a transient increase of DC components caused by the rapid increase of the input voltage Vin, resulting in an increase of the risk to generate an overcurrent, caused by a saturated current, flowing through the switching elements Q1 to Q4.

However, in this case, the power converter 10 according to the first embodiment is configured to perform the second current-feedback control mode such that the measured input-current value Id matches the command current value Iref determined as the offset peak Iofs based on the measured input-current value Id and the offset current value α.

This makes it possible to prevent the command current value Iref from being deviated from the value of the composite current signal Ic corresponding to the measured input-current value Id during the period from the time t12 to the time t14. This prevents the transformer Tr from being magnetically biased due to DC components, making it possible to prevent the occurrence of an overcurrent clue to the magnetically biased transformer Tr.

Similarly, as illustrated in FIG. 4, let us consider a case where the input voltage Vin rapidly increases from a low level from time t16 during the on state of the second set of switching elements Q2 and Q3, so that the measured input-current value Id rapidly increases from the time t16. In this case, the power converter 10 is configured to perform the second current-feedback control mode such that the measured current value Id of the input current matches the command current value Iref determined based on the measured input-current value id and the offset current value α.

This makes it possible to prevent the command current value Iref from being deviated from the value of the composite current signal Ic corresponding to the measured input-current value Id during the period from the time t16 to the time t18. This prevents the transformer Tr from being magnetically biased, making it possible to prevent the occurrence of an overcurrent due to the magnetically biased transformer Tr.

Figure 5:
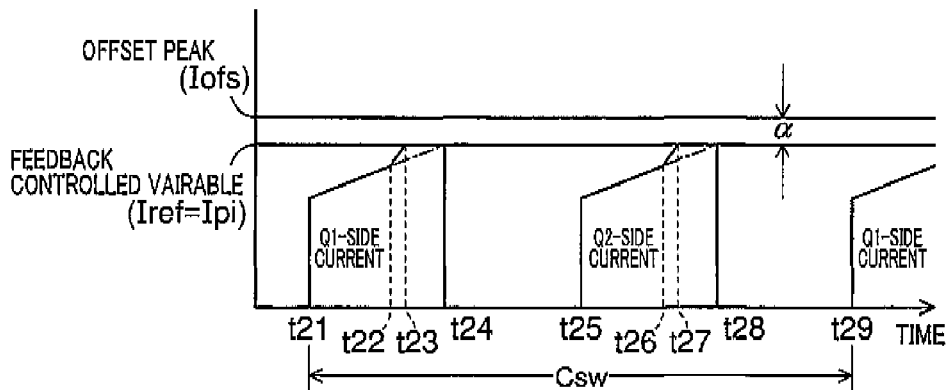
FIG. 5 is a timing chart schematically illustrating another example of how each of the Q1-side current and Q2-side current varies when the feedback controlled variable is equal to or lower than the offset peak in an unsteady state of the input voltage.

In addition, FIG. 5 schematically illustrates how each of the Q1-side current and Q2-side current varies under the feedback control set forth above when the feedback controlled variable Ipi for the input current to the power converter 10 is equal to or lower than the offset peak Iofs in a case where:

the input voltage Vin rapidly increases at time t22 during the on state of the first set of switching elements Q1 and Q4, so that the measured input-current value Id rapidly increases from the time t22.

In this case, the power converter 10 is configured to perform the first current-feedback control mode such that the measured input-current value Id matches the command current value Iref corresponding to the feedback controlled variable Ipi.

This makes it possible to prevent the command current value Iref from being deviated from the value of the composite current signal Ic corresponding to the measured input-current value Id during the period from the time t22 to the time t24. This prevents the transformer Tr from being magnetically biased, making it possible to prevent the occurrence of an overcurrent due to the magnetically biased transformer Tr.

Similarly, as illustrated in FIG. 5, if the input voltage Vin rapidly increases at time t26, so that the measured input-current value Id rapidly increases at the time t26, the power converter 10 is configured to perform the first current-feedback control mode such that the measured input-current value Id matches the command current value Iref corresponding to the feedback controlled variable Ipi.

This makes it possible to prevent the command current value Iref from being deviated from the value of the composite current signal Ic corresponding to the measured input-current value Id during the period from the time t26 to the time t28. This prevents the transformer Tr from being magnetically biased, making it possible to prevent the occurrence of an overcurrent due to the magnetically biased transformer Tr.

In the examples of the operations of the feedback unit 19 illustrated in FIGS. 2 to 5, a peak of the composite current signal Ic during the first cycle for the switching elements Q1 and Q3 in the switching cycle Csw and that of the composite current signal Ic during the second cycle for the switching elements Q2 and Q3 in the switching cycle Csw are the same value as the Ipk. However, a peak of the composite current signal Ic during the first cycle may be different from that of the composite current signal Ic during the second cycle depending on the conditions of the load Z.

Figure 6:
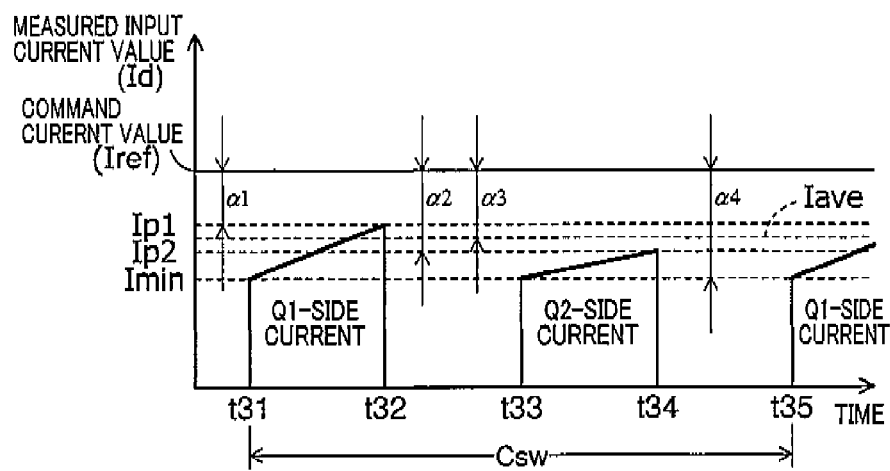
FIG. 6 is a timing chart schematically illustrating a further example of how each of the Q1-side current and Q2-side current varies when a first peak of a composite current signal during a first cycle of a switching cycle is higher than a second peak of the composite current signal during a second cycle of the switching cycle.

FIG. 6 schematically illustrates how each of the Q1-side current and Q2-side current varies under the feedback control set forth above when a first peak Ipk1 of the composite current signal Ic during the first cycle is different from, i.e. higher than, a second peak Ipk2 of the composite current signal Ic during the second cycle. The drive timings of the switching elements Q1 to Q4 illustrated in FIG. 6 are substantially identical to those illustrated in FIG. 2 as long as the times t11, t14, t15, t18, and t19 illustrated in FIG. 2 should be read as times t31, t32, t33, t34, and t35 illustrated in FIG. 6, respectively.

Specifically, as illustrated in FIG. 6, the composite current signal Ic during the switching elements Q1 and Q4 being on becomes the first peak Ipk1 at time t32 corresponding to the turn-off timing of the switching elements Q1 and Q4. In other words, the composite current signal Ic during the switching elements Q1 and Q4 being on becomes a minimum value Imin at time t31 corresponding to the turn-on timing of the switching elements Q1 and Q4.

Similarly, the composite current signal Ic during the switching elements Q2 and Q3 being on becomes the peak Ipk2 at time t34 corresponding to the turn-off timing of the switching elements Q2 and Q3. In other words, the composite current signal Ic during the switching elements Q2 and Q3 being on becomes the minimum value Imin at time t33 corresponding to the turn-on timing of the switching elements Q2 and Q3.

In the example illustrated in FIG. 6, the peak detector 19*f* can select the first peak Ipk1 or the second peak Ipk2 as the peak Ipk of the composite current signal Ic for the corresponding predetermined switching cycle Csw. The peak detector 19*f* can also select an average value Iave of the first peak Ipk1 and the second peak Ipk2 as the peak Ipk of the composite current signal Ic for the corresponding predetermined switching cycle Csw.

In addition, the peak detector 19*f* can, select, as the peak Ipk, the minimum peak Imin of the composite current signal Ic for the corresponding predetermined switching cycle Csw.

If the peak detector 19*f* selects the first peak Ipk1 as the peak Ipk of the composite current signal Ic for the corresponding predetermined switching cycle Csw, an offset current value $\alpha 1$ is used as the offset current value $\alpha$. If the peak detector 19*f* selects the peak Ipk2 as the peak Ipk of the composite current signal Ic for the corresponding predetermined switching cycle Csw, an offset current value $\alpha 2$ higher than the offset current value $\alpha 1$ is used as the offset current value $\alpha$. If the peak detector 19*f* selects the average value Iave as the peak Ipk of the composite current signal Ic for the corresponding predetermined switching cycle Csw, an offset current value $\alpha 3$ higher than, the offset current value $\alpha 1$ and lower than the offset current value $\alpha 3$ is used as the offset current value $\alpha$. In addition, if the peak detector 19*f* selects the minimum peak Imin as the peak Ipk of the composite current signal Ic for the corresponding predetermined switching cycle Csw, an offset current value $\alpha 4$ higher than all the offset current values $\alpha 1$ to $\alpha 3$ is used as the offset current value $\alpha$.

The offset current values $\alpha 1$ to $\alpha 4$ are determined such that:

the sum of the first peak Ipk1 and the offset current value $\alpha 1$, the sum of the second peak Ipk2 and the offset current value $\alpha 2$, the sum of the peak Iave and the offset current value $\alpha 3$, and the sum of the peak Imin and the offset current value $\alpha 4$ become a constant current value to be used as the offset peak Iofs.

This configuration permits, even if any one of the peaks Ipk1, Ipk2, Iave, and Imin is selected as the peak Ipk of the composite current signal Ic for the corresponding predetermined switching cycle Csw, the command current value Iref to be set to the constant current value Iofs during the second current-feedback control mode.

In a modification of the example illustrated in FIG. 6, the peak detector 19*f* can select a given value of the composite current signal Ic during the switching elements Q1 and Q4 being on (see the thick region of the composite current signal Ic from the time t31 to the time t32) as the peak Ipk of the composite current signal Ic for the corresponding predetermined switching cycle Csw. Similarly, in this modification, the peak detector 19*f* can select a given value of the composite current signal Ic during the switching elements Q2 and Q3 being on (see the thick region of the composite current signal Ic from the time t33 to the time t34) as the peak Ipk of the composite current signal Ic for the corresponding predetermined switching cycle Csw.

In this modification, the command current value Iref used in the second current-feedback mode is preferably set to a constant value. Thus, in this modification, the offset setter 19*e* can be operative to set the absolute difference between the command current value Iref and a given value of the composite current signal Ic selected as the peak current Ipk as the offset current value $\alpha$. This modification makes it possible for the signal comparator 18 to use the constant command current value Iref in the second current-feedback control mode even if a given value of the composite current signal Ic is selected as the peak Ipk of the composite current signal Ic. This results in reliable execution of the second current-feedback control mode even if a given value of the composite current signal Ic is selected as the peak Ipk of the composite current signal Ic.

As described above, the power converter 10 according to the first embodiment is configured such that:

the feedback unit 19 selects, as the command current value Iref, one of: the value of the feedback controlled variable Ipi determined based on the measured value Vd of the output voltage Vout; and the offset peak Iofs determined directly based on the measured input-current value Id.

This configuration makes it possible to select, as the command current value Iref, the offset peak Iofs determined directly based on the measured input-current value Id to the power converter 10 if the input voltage Vin rapidly increases from a low level range which is, for example, close to zero level. That is, because the offset peak Iofs is determined directly based on the measured input-current value Id, the offset peak Iofs selected as the command current value Iref follows the rapid increase of the input current to the power converter 10 due to the rapid increase of the input voltage Vin. This makes it possible to prevent the command current value Iref from being deviated from the value of the composite current signal Ic corresponding to the measured input-current value Id. This prevents the transformer Tr from being magnetically biased, making it possible to prevent the occurrence of an overcurrent due to the magnetically biased transformer Tr.

In addition, the feedback unit 19 is configured to select, as the command current value Iref, one of the value of the feedback controlled variable Ipi and the offset peak Iofs; one of the value of the feedback controlled variable Ipi and the offset peak Iofs is lower than the other thereof. In other words, the feedback unit 19 selects, as the command current value Iref, whichever one of the value of the feedback controlled variable Ipi and the offset peak Iofs that is closer to the peak Ipk of the composite current signal Ic.

This configuration reduces the magnitude of the current deviation $\Delta I$ between the value of the composite current signal Ic and the command current value Idir corresponding to the command current value Iref. This results in a reduction of the change in the manipulated variables for driving the switching elements Q1 to Q4.

The feedback unit 19 is configured to calculate the sum of the peak Ipk of the composite current signal Ic and the offset current value $\alpha$, thus generating the offset peak Iofs; the offset peak Iofs is used to be compared with the measured input-current value Id by the signal comparator 18 in the second current-feedback control mode. This configuration prevents the measured input-current value Id from exceeding the offset peak Iofs. This reliably prevents the command current value Iref corresponding to the offset peak Iofs in the second current-feedback control mode from being deviated from the value of the composite current signal Ic corresponding to the measured input-current value Id. This reliably prevents the transformer Tr from being magnetically biased, making it possible to reliably prevent the occurrence of an overcurrent due to the magnetically biased transformer Tr.

The configuration of the feedback unit 19 is able to select, as the peak Ipk of the composite current signal Ic, one of:

the first peak Ipk1 of the composite current signal during the first cycle as a first selection;

the second peak Ipk2 of the composite current signal during the first cycle as a second selection;

the average value Iave of the first and second peaks Ipk1 and Ipk2 as a third selection;

the minimum peak of the composite current signal Ic for the corresponding predetermined switching cycle Csw as a fourth selection; and a given value of the composite current signal Ic for one of the first and second cycles of the corresponding predetermined switching cycle Csw as a fifth selection.

In each of the first selection and the second selection, it is possible to prevent the measured input-current value Id from exceeding the offset peak Iofs for a corresponding one of the first and second cycles of the predetermined switching cycle Csw.

In each of the first to fifth selections, setting the offset value current value $\alpha$ suitable for a corresponding one of the first to fifth selections permits usage of a constant command current value Iref in the second current-feedback control mode. This results in reliable execution of the second current-feedback control mode even if a given value of the composite current signal Ic is selected as the peak Ipk of the composite current signal Ic.

Moreover, the feedback unit 19 is configured to calculate the sum of the peak Ipk of the composite current signal Ic and the offset current value $\alpha$, thus generating the sum as the offset peak Iofs. This permits, as the command current value Iref, the constant current value Iofs to be input to the signal comparator 18 during the second current-feedback control mode. This prevents the command current value Iref from being deviated from the value of the composite current signal Ic corresponding to the measured input-current value Id. This prevents the transformer Tr from being magnetically biased, making it possible to prevent the occurrence of an overcurrent due to the bias magnetization of the transformer Tr.

Second Embodiment

A power converter 10A according to a second embodiment of the present disclosure will be described hereinafter with reference to FIGS. 7 to 9.

The structure and/or functions of the power converter 10A according to the second embodiment are different from those of the power converter 10 by the following points. So, the different points will be mainly described hereinafter, and therefore, redundant descriptions of like parts between the embodiments, to which like reference characters are assigned, are omitted or simplified.

A feedback unit 19A of the power converter 10A according to the second embodiment is equipped with a reducing module for reducing the command current value Iref to thereby preventing rapid variation of the measured input-current value Id.

Figure 7A:
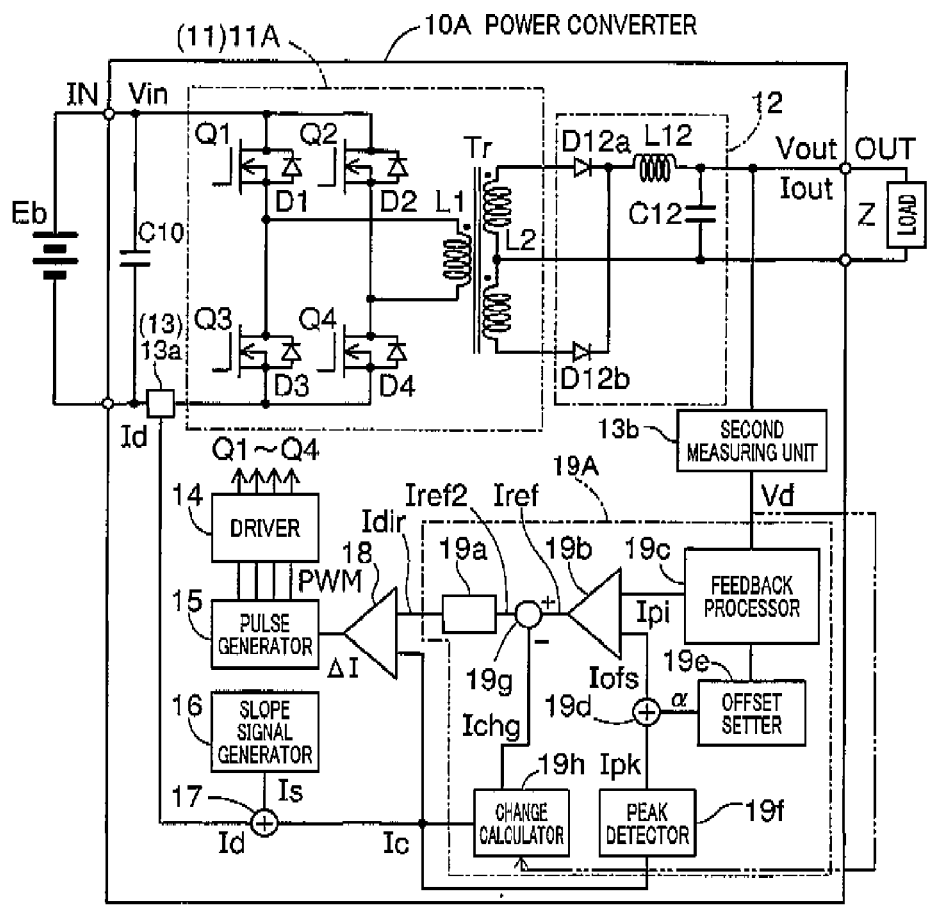
FIG. 7A is a circuit diagram schematically illustrating an example of the overall configuration of a power converter according to a second embodiment of the present disclosure.

Specifically, referring to FIG. 7A, the feedback unit 19A is equipped with a change calculator 19h and a command-current reducing unit 19g as an example of the reducing module.

The composite current signal Ic is configured to be input to the change calculator 19h in addition to the peak detector 19f.

The change calculator 19h is operative to measure, for each predetermined switching cycle Csw, a change quantity Ichg of the composite current signal Ic per unit time in, for example, digital format. In other words, the change calculator 19h is operative to measure, for each predetermined switching cycle Csw, the rate of change of the composite current signal Ic. Then, the change calculator 19h is operative to output the measured change quantity Ichg of the composite current Ic to the command-current reducing unit 19g. The measured change quantity Ichg of the composite current Ic will be referred to as a measured current-change quantity Ichg hereinafter.

Figure 7B:
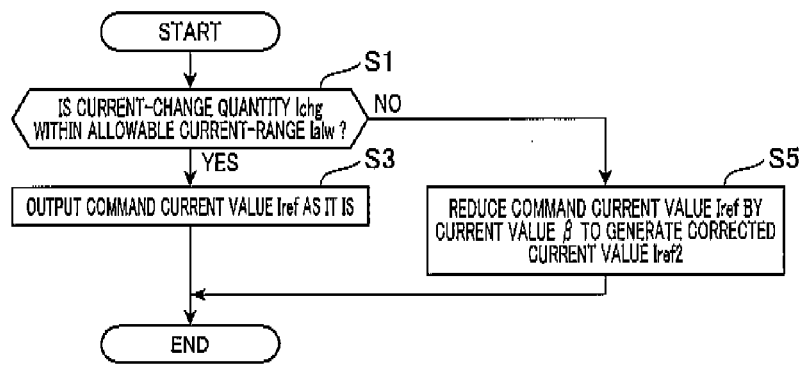
FIG. 7B is a flowchart schematically illustrating an example of how to correct a command current value by a feedback unit according to the second embodiment.

The command-current reducing unit 19g is operative to determine whether the measured current-change quantity Ichg is within an allowable current-range Ialw in step S1 of FIG. 7B.

Upon determination that the measured current-change quantity Ichg is within the allowable current-range Ialw (YES in step S1), the command-current reducing unit 19g outputs the command current value Iref output from the minimum-value selector 19b as it is in step S3.

Otherwise, upon determination that the measured current-change quantity Ichg is out of the allowable current-range Ialw (NO in step S1), the command-current reducing unit 19g reduces the command current value Iref output from the minimum-value selector 19b by a current value β to generate a corrected command current value Iref2 in step S5. Then, the command-current reducing unit 19g outputs the corrected command current value Iref2 to the DAC 19a in step S5. Thus, the DAC 19a is operative to convert the corrected command current value Iref2 into a command current value Idir in the analog format, and output the command current value Idir in the analog format to the signal comparator 18.

In step S5, it is preferable that the command-current reducing unit 19g changes the current value β depending on a variation in the measured current-change quantity Ichg, thus changing the corrected command current value Iref2. Note that the allowable current-range Ialw can be optionally set. For example, the allowable current-range Ialw can be set to a constant current range or a range allowed to prevent the transformer Tr from being magnetically biased.

Next, operations of the feedback unit 19A of the power converter 10A for driving the switching element Q1 to Q4 will be described with reference to FIGS. 8 and 9. Note that FIG. 8, corresponding to FIG. 4, schematically illustrates an example of operations of the feedback unit 19A when the feedback controlled variable Ipi for the input current to the power converter 10A is higher than the offset peak Iofs, which is expressed as: Ipi>Iofs. FIG. 9, corresponding to FIG. 5, schematically illustrates an example of operations of the feedback unit 19 when the feedback controlled variable Ipi for the input current to the power converter 10 is equal to or lower than the offset peak Iofs, which is expressed as: Ipi≤Iofs. Note that, in the second embodiment, the allowable current-range Ialw used in the case of FIG. 8 is set to be equal to that used in the case of FIG. 9, but, for example, they can be different from each other. For example, the allowable current-range Ialw used in the case of FIG. 9 can be narrower than that used in the case of FIG. 8.

Figure 8:
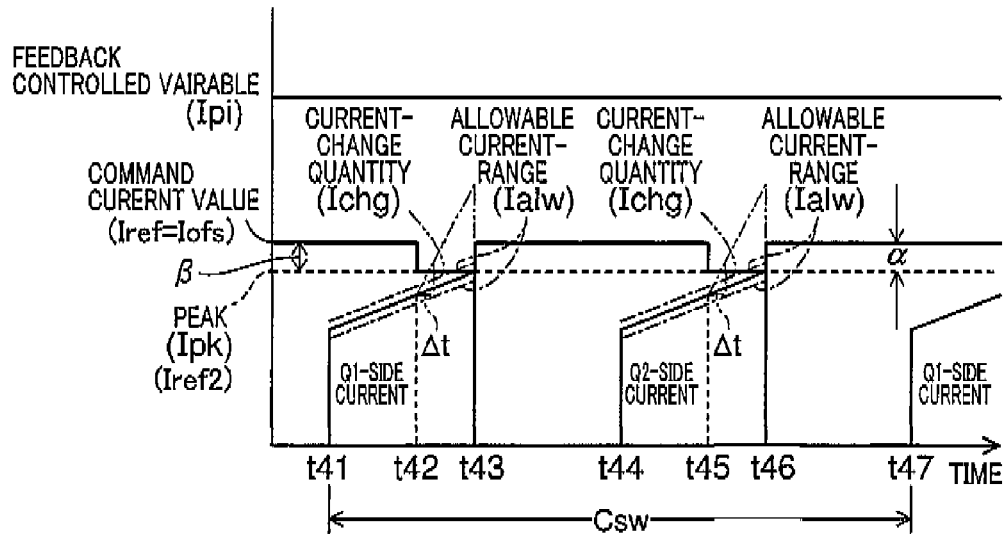
FIG. 8 is a timing chart schematically illustrating an example of how each of the Q1-side current and Q2-side current varies when the feedback controlled variable is higher than the offset peak in an unsteady state of the input voltage according to the second embodiment.

As illustrated in FIG. 8, let us assume that the input voltage Vin starts to rapidly increase from time t42 during the on state of the first set of switching elements Q1 and Q4.

In this assumption, the measured input-current value Id starts to rapidly increase from the time t42. At the time t42, the change calculator 19h measures the amount of change Ichg of the composite current signal Ic per unit time Δt as a current-change quantity, and outputs the measured current-change quantity Ichg to the command-current reducing unit 19g.

If the measured current-change quantity Ichg is out of the allowable current-range Ialw (see the negative determination in step S1), the command-current reducing unit 19g reduces the command current value Iref by the current value β, thus generating the corrected command current value Iref2 (see step S5). This feedback control based on the operations in steps S1 and S5 permits variations of the measured input-current value Id to be maintained within the allowable current-range Ialw. At time t43, the switching elements Q1 and Q4 are switched off, so that the command-current reducing unit 19g stops the reduction of the command current value Iref.

After lapse of a predetermined dead time from the time t43, the driver 14 simultaneously turns on both the switching elements Q2 and Q3 at time t44, and continues the on state of the switching elements Q2 and Q3 up to time t45.

At that time, as illustrated in FIG. 8, let us assume that the input voltage Vin starts to rapidly increase from time t45 during the on state of the second set of switching elements Q2 and Q3.

In this assumption, the measured input-current value Id starts to rapidly increase from the time t45.

At the time t45, like the on state of the first set of switching elements Q1 and Q4, the feedback control based on the operations in steps S1 and S5 permits variations of the measured input-current value Id to be maintained within the allowable current-range Ialw. At time t46, the switching elements Q2 and Q3 are switched off, so that the command-current reducing unit 19g stops the reduction of the command current value Iref.

Figure 9:
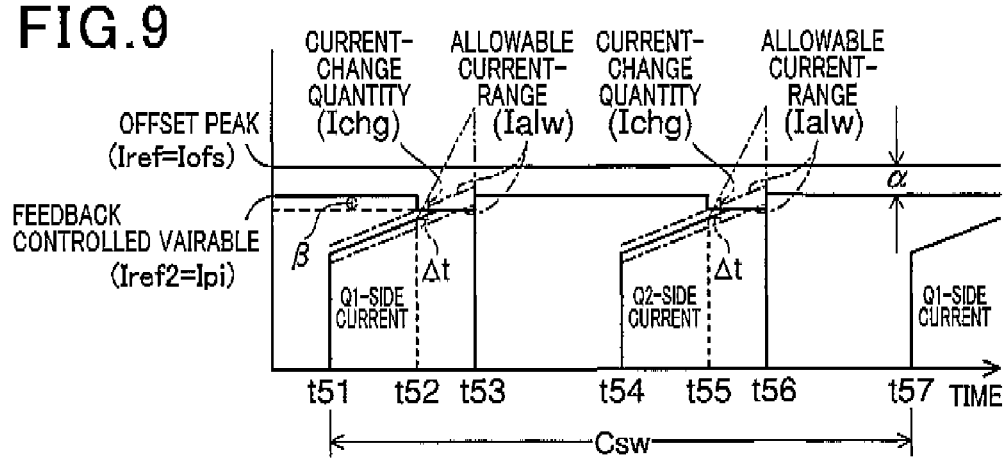
FIG. 9 is a timing chart schematically illustrating an example of how each of the Q1-side current and Q2-side current varies when the feedback controlled variable is equal to or lower than the offset peak in an unsteady state of the input voltage according to the second embodiment.

As illustrated in FIG. 9, let us assume that the input voltage Vin starts to rapidly increase from time t52 during the on state of the first set of switching elements Q1 and Q4.

In this assumption, the measured input-current value Id starts to rapidly increase from the time t52. At the time t52, the change calculator 19h measures the amount of change Ichg of the composite current signal Ic per unit time Δt as a current-change quantity, and outputs the measured current-change quantity Ichg to the command-current reducing unit 19g.

If the measured current-change quantity Ichg is out of the allowable current-range Ialw (see the negative determination in step S1), the command-current reducing unit 19g reduces the command current value Iref by the current value β, thus generating the corrected command current value Iref2 (see step S5). This feedback control based on the operations in steps S1 and S5 permits variations of the measured input-current value Id to be maintained within the allowable current-range Ialw. At time t53, the switching elements Q1 and Q4 are switched off, so that the command-current reducing unit 19g stops the reduction of the command current value Iref.

After lapse of a predetermined dead time from the time t53, the driver 14 simultaneously turns on both the switching elements Q2 and Q3 at time t54, and continues the on state of the switching elements Q2 and Q3 up to time t56.

At that time as illustrated in FIG. 9, let us assume that the input voltage Vin starts to rapidly increase from time t55 during the on state of the second set of switching elements Q2 and Q3.

In this assumption, the measured input-current value Id starts to rapidly increase from the time t55.

At the time t55, like the on state of the first set of switching elements Q1 and Q4, the feedback control based on the operations in steps S1 and S5 permits variations of the measured input-current value Id to be maintained within the allowable current-range Ialw. At time t56, the switching elements Q2 and Q3 are switched off, so that the command-current reducing unit 19g stops the reduction of the command current value Iref.

As described above, in the power converter 10A according to the second embodiment, the feedback unit 19A is comprised of the change calculator 19h and the command-current reducing unit 19g. The change calculator 19h measures, for each predetermined switching cycle Csw, an amount of change Ichg of the composite current signal Ic per unit time, in other words, the rate of change of the composite current signal Ic. The command-current reducing unit 19g determines whether a measured current-change quantity Ichg, i.e. the measured amount of change Ichg of the composite current signal Ic per unit of time, is within the allowable current-range Ialw. Upon determination that the measured current-change quantity Ichg is out of the allowable current-range Ialw, the command-current reducing unit 19g reduces the command current value Iref output from the minimum-value selector 19b by the current value β to generate a corrected command current value Iref2, and outputs the corrected command current value Iref2 to the DAC 19a. This results in the command current value Idir based on the corrected command current value Iref2 being used by the signal comparator 18.

This configuration of the power converter 10A makes it possible to, even if the input voltage Vin starts to rapidly increase from a low level, reduce the command current value Iref depending on the increase in the input voltage Vin, thus inputting, to the signal processor 18 via the DAC 19a, a corrected command current value Iref2 lower than the command current value Iref as the command current value Iref. This permits the signal comparator 18 and the pulse generator 15 to generate the duty factors of the PWM signals for the respective switching elements Q1 to Q4 that limit a rapid increase of the measured input-current value Id. This prevents the transformer Tr from being magnetically biased due to a transient increase of DC components caused by the rapid increase of the input voltage Vin, making it possible to prevent the occurrence of an overcurrent due to the magnetically biased transformer Tr.

Preferably, the command-current reducing unit 19g changes the current value β depending on a variation in the measured current-change quantity Ichg, thus changing the corrected command current value Iref2. This configuration increases the current value β, which should be subtracted from the command current value Iref, depending on the rapid increase of the measured current-change quantity Ichg. This results in limitation of a rapid increase of the measured input-current value Id. This further prevents the transformer Tr from being magnetically biased due to a transient increase of DC components caused by the rapid increase of the input voltage Vin, making it possible to prevent the occurrence of an overcurrent due to the magnetically biased transformer Tr.

Note that, the change calculator 19h can measure, for each predetermined switching cycle Csw, a change quantity of the measured output-voltage value Vd per unit time, in other words, the rate of change of the measured output-voltage value Vd. In this modification, as illustrated in FIG. 7A, the change calculator 19h is connected to the second measuring unit 13b (see a phantom line therebetween).

In addition, the change calculator 19h can measure, for each predetermined switching cycle Csw, an amount of change Ichg of the composite current signal Ic per unit time, and an amount of change of the measured value Vd of the output voltage Vout per unit time. In each of the modifications, it is possible to reduce the command current value Iref output from the minimum-value selector 19b by a current value β. The current value β depends on at least one of: the measured change quantity of the composite current signal Ic per unit time and a change quantity of the measured output-voltage value Vd per unit time. Thus, each of the modifications achieves the same effects achieved by the second embodiment.

Third Embodiment

Figure 10:
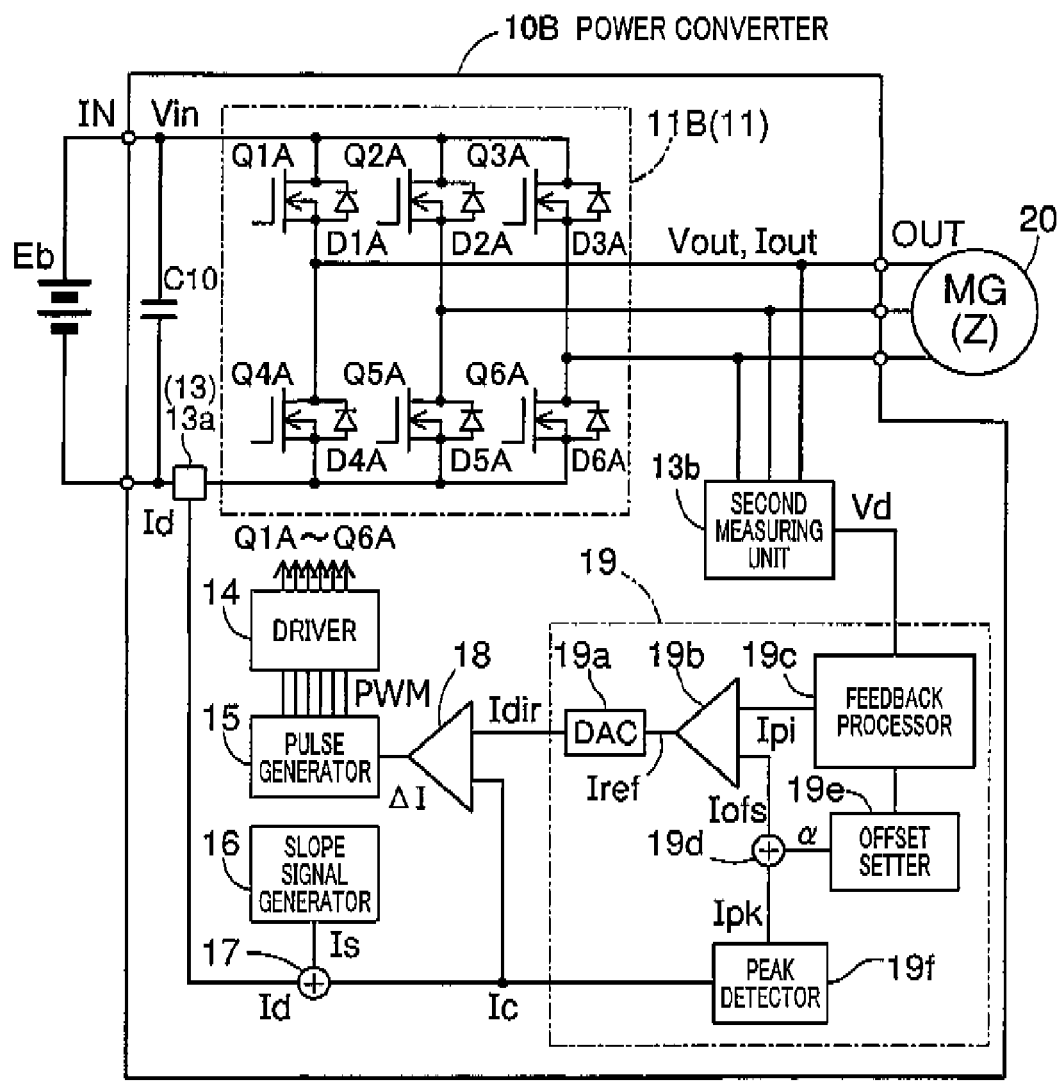
FIG. 10 is a circuit diagram schematically illustrating an example of the overall configuration of a power converter according to a third embodiment of the present disclosure.

A power converter 10B according to a third embodiment of the present disclosure will be described hereinafter with reference to FIG. 10.

The structure and/or functions of the power converter 10B according to the third embodiment are different from those of the power converter 10 by the following points. So, the different points will be mainly described hereinafter, and therefore, redundant descriptions of like parts between the embodiments, to which like reference characters are assigned, are omitted or simplified.

The power converter 10B according to the third embodiment is comprised of a switch circuit 11B in place of the switch circuit 11A according to the first embodiment. The switch circuit 11B is operative to output a three-phase AC voltage as an example of periodic voltage signals whose at least one of voltage and frequency varies with time. The three-phase AC voltage is supplied to a three-phase rotary electric machine 20 as an example of inductive loads in place of the load Z. That is, the power converter 10B serves as a three-phase inverter.

For example, the three-phase rotary electric machine 20 is provided with: an armature comprised of an inductive core and three-phase armature windings wound therearound; and a field member comprised of, for example, one or more magnets. When the armature is energized to generate a magnetic field, the generated magnetic field of the armature and a magnetic field generated by the field member cooperatively rotate any one of the armature and the field member relative to the other thereof to thereby create torque.

The power converter 10B has first, second, and third phase output terminals OUT, such as, U-, V-, and W-phase output terminals OUT connected, via cables, to respective the three-phase armature windings, that is, U-, V-, and W-phase armature windings, of the three-phase rotary electric machine 20.

The switch circuit 11B is comprised of a first pair of series-connected switching elements Q1A and Q4A, a second pair of series-connected switching elements Q2A and Q5A, a third pair of series-connected switching elements Q3A and Q6A, and diodes D1A to D6A. For example, as the switching elements Q1A to Q6A, IGBTs or power MOSFETs can be respectively used.

Each of the switching elements Q1A to Q6A has a first terminal, a second terminal, and a conductive path formed therebetween. The first terminal of the switching element Q1A is connected to the positive input terminal IN via the positive DC input line. The second terminal of the switching element Q1A is connected to the first terminal of the switching element Q4A to constitute the series-connected switching elements Q1A and Q4A. The second terminal of the switching element Q4A is connected to the negative input terminal IN via the negative DC input line.

Similarly, the first terminal of the switching element Q2A is connected to the positive input terminal IN via the positive DC input line. The second terminal of the switching element Q2A is connected to the first terminal of the switching element Q5A to constitute the series-connected switching elements Q2A and Q5A. The second terminal of the switching element Q5A is connected to the negative input terminal IN via the negative DC input line.

In addition, the first terminal of the switching element Q3A is connected to the positive input terminal IN via the positive DC input line. The second terminal of the switching element Q3A is connected to the first terminal of the switching element Q6A to constitute the series-connected switching elements Q3A and Q6A. The second terminal of the switching element Q6A is connected to the negative input terminal IN via the negative DC input line.

With the configuration, the switching elements Q1A to Q3A will also be referred to as high-side switching elements, and the switching elements Q4A to Q6A will also be referred to as low-side switching elements.

Each of the diodes D1A to D6A is connected between the first end and second end of a corresponding one of the switching elements Q1A to Q6A in antiparallel thereto, and serves as a free-wheel diode.

If power MOSFETs are used as the switching elements Q1A to Q6A, intrinsic diodes of the power MOSFETs can be used as the flee-wheel diodes, thus eliminating the free-wheel diodes.

The series-connected switching elements Q1A and Q4A, the series-connected switching elements Q2A and Q5A, and the series-connected switching elements Q3A and Q6A are parallelly connected to each other in bridge configuration.

Each of the switching elements Q1A to Q6A has a control terminal connected to the driver 14.

In the third embodiment, a connecting point between the series-connected switching elements Q1A and Q4A is connected to the first-phase output terminal OUT connected to the U-phase armature winding. A connecting point between the series-connected switching elements Q2A and Q5A is connected to the second-phase output terminal OUT connected to the V-phase armature winding. A connecting point between the series-connected switching elements Q3A and Q6A is connected to the third-phase output terminal OUT connected to the W-phase armature winding.

Because the output voltage Vout output from the switch circuit 11B is a three-phase AC voltage, the second measuring unit 13b is operative to measure an instantaneous value, an absolute value, a peak value, an effective value, or the like as a value Vd of the output voltage Vout for each phase in an analog format. The second measuring unit 13b is also operative to output the measured value Vd of the output voltage Vout for each phase to the feedback unit 19.

Specifically, the high- and low-side switching elements Q1A and Q4A correspond to the pair of switching elements Q1 and Q3 or the pair of switching elements Q2 and Q4. Similarly, the high- and low-side switching elements Q2A and Q5A correspond to the pair of switching elements Q1 and Q3 or the pair of switching elements Q2 and Q4. The high- and low-side switching elements Q3A and Q6A correspond to the pair of switching elements Q1 and Q3 or the pair of switching elements Q2 and Q4.

That is, one of the high-side switching elements Q1A to Q3A is sequentially turned on with dead times between the adjacent on durations while a corresponding same-phase low-side switching element is sequentially turned off (see FIGS. 2 to 6). This causes the switch circuit 11B to serve as an inverter.

Other elements of the power converter 10B according to the third embodiment are substantially identical to those of the power converter 10 according to the first embodiment.

Accordingly, the feedback unit 19 of the power converter 10B is operative to select, as the command current value Iref, one of: the value of the feedback controlled variable Ipi determined based on the measured value Vd of the output voltage Vout for each phase; and the offset peak Iofs determined directly based on the measured input-current value Id.

This configuration therefore achieves the same effects as those achieved by the power converter 10 according to the first embodiment. That is, this configuration prevents the transformer Tr from being magnetically biased, making it possible to prevent the occurrence of an overcurrent due to the magnetically biased transformer Tr.

Fourth Embodiment

Figure 11:
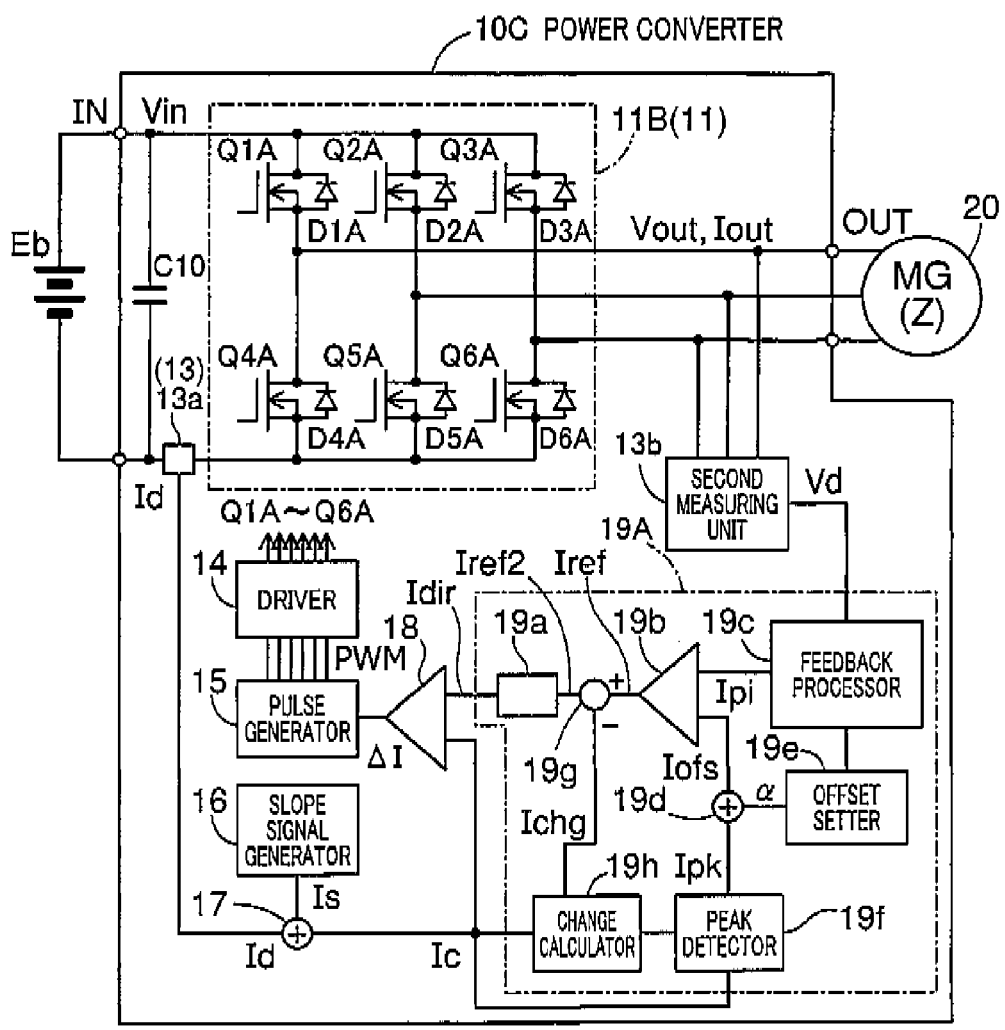
FIG. 11 is a circuit diagram schematically illustrating an example of the overall configuration of a power converter according to a fourth embodiment of the present disclosure.

A power converter 10C according to a fourth embodiment of the present disclosure will be described hereinafter with reference to FIG. 11.

The structure and/or functions of the power converter 10C according to the fourth embodiment are different from those of the power converter 10A according to the second embodiment by the following points. So, the different points will be mainly described hereinafter, and therefor, redundant descriptions of like parts between the embodiments, to which like reference characters are assigned, are omitted or simplified.

The power converter 10C according to the fourth embodiment is comprised of the switch circuit 11B according to the third embodiment; and the three-phase rotary electric machine 20 as a load according to the third embodiment.

Other elements of the power converter 10C according to the fourth embodiment are substantially identical to those of the power converter 10B according to the second embodiment.

Accordingly, the feedback unit 19A of the power converter 10C according to the fourth embodiment is operative to:

determine whether a measured current-change quantity Ichg is within the allowable current-range Ialw; and reduce the command current value Iref output from the minimum-value selector 19b by the current value β to generate a corrected command current value Iref2 to be used by the signal comparator 18 upon determination that the measured current-change quantity Ichg is out of the allowable current-range Ialw.

This configuration therefore achieves the same effects as those achieved by the power converter 10B according to the second embodiment. That is, this configuration prevents the transformer Tr from being magnetically biased due to a transient increase of DC components caused by the rapid increase of the input voltage Vin, making it possible to prevent the occurrence of an overcurrent due to the magnetically biased transformer Tr.

The first to fourth embodiments of the present disclosure and their modifications have been described, but the present disclosure is not limited thereto. Specifically, the first to fourth embodiments and their modifications can be freely changed within the scope of the present disclosure.

In each of the first to fourth embodiments, the signal processor 17 is configured to calculate the sum of the slope signal Is and the measured input-current value Id to generate the composite current signal Ic as the first electric parameter, but the present disclosure is not limited thereto.

Figure 12:
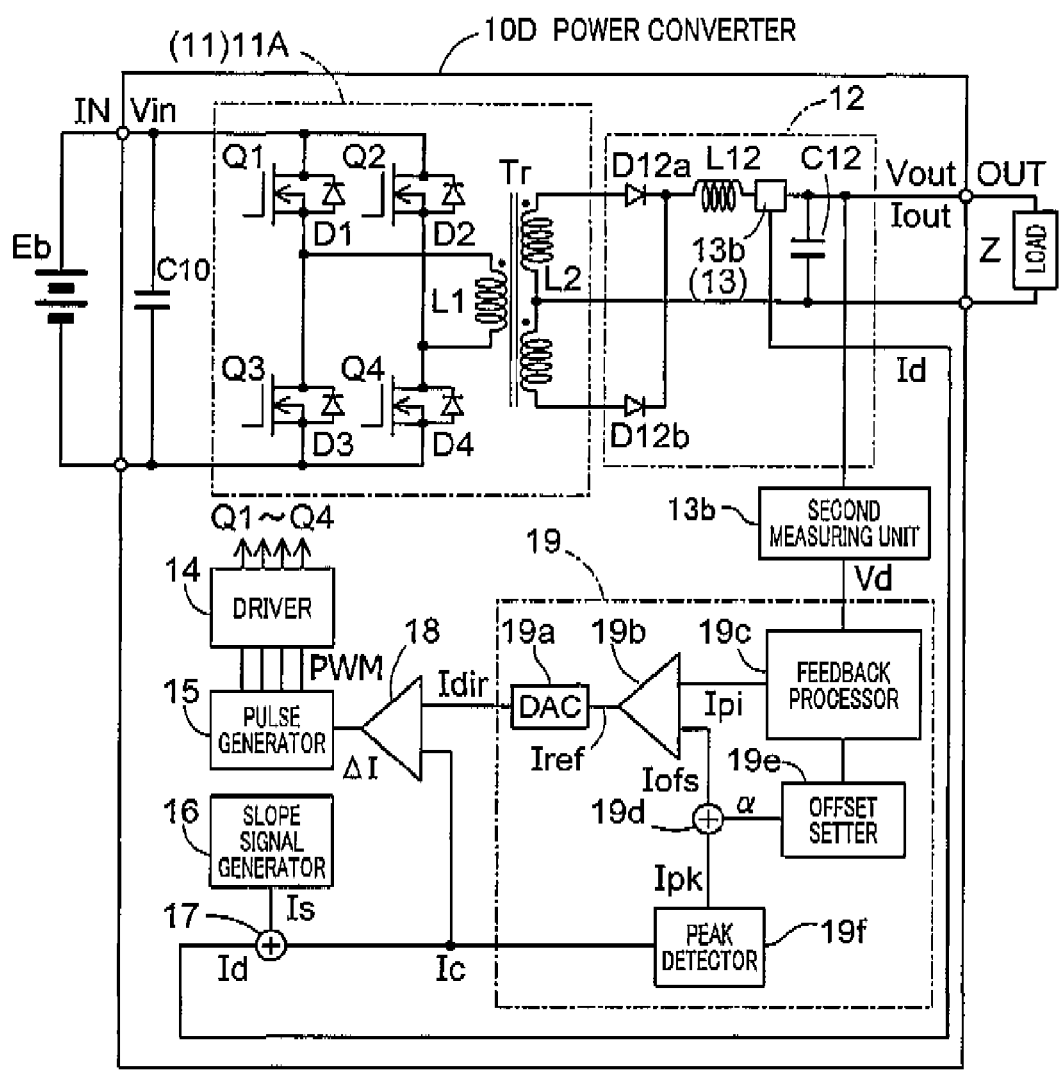
FIG. 12 is a circuit diagram, schematically illustrating an example of the overall configuration of a power converter according to a first exemplary modification of the first embodiment of the present disclosure.

Specifically, as illustrated in FIG. 12, a power converter 10D according to a first exemplary modification of, for example, the first embodiment can be provided with, in place of the first measuring unit 13a, a third measuring unit 13c located, for example, downstream of the coil L12. The third measuring unit 13c is operative to measure a value of output current Iout flowing through the coil L12; the output current Iout depends on the input current to the switch circuit 11A.

Then, the signal processor 17 can be configured to calculate the sum of the slope signal Is and the measured output-current value Iout to generate the composite current signal Ic as the first electric parameter. The peak detector 19f can measure, for each predetermined switching cycle Csw, a peak Ipk of the composite current signal Ic in the analog format supplied from the signal processor 17. This first exemplary modification substantially achieves the same effects as those achieved in the first embodiment. If the first exemplary modification is applied to each of the second to fourth embodiments, it is possible to achieve the same effects as those achieved in a corresponding one of the second to fourth embodiments.

In each of the first to fourth embodiments, the power converter 10 (10A, 10B, 10C) according to a second exemplary modification can be provided with the third measuring unit 13c illustrated in FIG. 12 in addition to the first measuring unit 13a.

That is, the signal, processor 17 according to the second exemplary modification can be configured to:

select one of the measured input-current value Id and the measured output-current value Iout; and calculate the sum of the slope signal Is and the selected one of the measured input-current value Id and the measured output-current value Iout to generate the composite current signal Ic as the first electric parameter.

In the second exemplary modification, the signal processor 17 can select one of the measured input-current value Id and the measured output-current value Iout which is higher or lower than the other thereof. In the second exemplary modification, the signal processor 17 can select a local peak in the measured input-current value Id and the measured output-current value Iout while a corresponding pair of switching elements is on.

In the second exemplary modification, as illustrated in FIG. 6, the signal processor 17 can select:

a given value of the measured values Id of the input current to the switch circuit 11A while a corresponding pair of switching elements is on (see the thick region of the composite current signal Ic from the time t31 to the time t32); and a given value of the measured values Iout of the output current while the corresponding pair of switching elements is on.

Then, the signal processor 17 can calculate the average value of the selected value of the measured values Id of the input current and the selected value of the measured values Iout of the output current, and calculate the sum of the slope signal Is and the calculated average value.

Because the output current Iout depends on the input current to the switch circuit 11A, the second modification can achieve substantially the same effects as those achieved by the first embodiment. If the second exemplary modification is applied to each of the second to fourth embodiments, it is possible to achieve the same effects as those achieved in a corresponding one of the second to fourth embodiments.

In each of the first to fourth embodiments, the slope signal generator 16 can be eliminated. In this modification, the measured value Id of the input current is configured to be input to the peak detector 19f, and the peak detector 19f is configured to measure a peak of the measured value 19d of the input current as the peak Ipk.

In each of the first to fourth embodiments, the feedback processor 19c is operative to calculate a difference Δ between the measured value Vd of the output voltage Vout and the target voltage value Vtag, but the present disclosure is not limited thereto.

Specifically, in a third exemplary modification, in place of the second measuring unit 13b, the third measuring unit 13c can be provided as illustrated in FIG. 12.

The feedback processor 19c according to the third exemplary modification can be operative to calculate a difference Δ between a value of the output current Iout measured by the third measuring unit 13c illustrated in FIG. 12 and a target current value. The target current value can be for example set to a value required for the load Z. The power converter 10 can be provided with a unit for setting the target current value, or can be designed to set the target current value based on signals and/or data supplied from an external unit, such as an external ECU or an external computer.

This configuration achieves the same effects as those achieved by the power converter 10 according to the first embodiment. That is, this configuration prevents the transformer Tr from being magnetically biased due to a transient increase of DC components caused by the rapid increase of the input voltage Vin, making it possible to prevent the occurrence of an overcurrent due to the magnetically biased transformer Tr.

In the first and second embodiments, the power converters 10, 10A are each designed as a DC-DC converter, and in the third and fourth embodiments, the power converters 10B, 10C are each designed as an inverter. However, power converters according to the present disclosure can be designed as other devices each equipped with a plurality of switching elements and an inductive element, such as a transformer or a rotary machine including an inductive core.

In the first and second embodiments, the power converters 10, 10A are each equipped with the transformer Tr as an inductive element. In addition, in the third and fourth embodiments, the power converters 10B, 10C are each designed to convert input power into output power different therefrom, and output the converted power to the rotary machine 20 as an inductive element. However, the present disclosure is not limited thereto. Specifically, the power converters 10, 10A can be each equipped with at least one coil as an inductive element. The power converters 10B and 10C can be designed to convert input power into output power different therefrom, and output the converted power to an electric device including at least one coil as an inductive element. As the transformer Tb, a transformer with no center taps can be used.

In each of the first and second embodiments, the switch circuit 11A, 11B is designed as a full-bridge circuit comprised of the series-connected switching elements Q1 and Q3 and the series-connected switching elements Q2 and Q4 parallelly connected to the series-connected switching elements. In the full-bridge circuit structure, the first set of switching elements Q1 and Q4 serves as, for example, a first switching element of the present disclosure, and the second set of switching elements Q2 and Q3 serves as, for example, a second switching element of the present disclosure. However, the present disclosure is not limited thereto.

Specifically, the switch circuit 11A, 11B can be designed as a half-bridge circuit comprised of the switching element Q1 and the switching element Q2 such that the portion of each of the switching elements Q3 and Q4 is short-circuited. In the half-bridge circuit, the driver 14 complementarily turns on the switching element Q1 and Q2 to thereby induced an AC voltage through the primary winding L1. In the half-bridge circuit structure, the switching element Q1 serves as, for example, a first switching element of the present disclosure, and the switching element Q2 serves as, for example, a second switching element of the present disclosure.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A power converter comprising:
   a driver that drives a switching element of a switch circuit using a manipulated variable for the switching element to convert input power to the switch circuit into output power of the switch circuit;

a first measuring unit that measures a value of a first electric parameter depending on the input power to the switch circuit;

a first determiner that determines, from the measured value of the first electric parameter, a first feedback controlled variable;

a second measuring unit that measures a value of a second electric parameter indicative of the output power from the switch circuit;

a calculator that calculates, based on the measured value of the second electric parameter and a command value for the second electric parameter, a second feedback controlled variable;

a selector that selects, based on the measured value of the first electric parameter, one of the first feedback controlled variable and the second feedback controlled variable; and a second determiner that determines the manipulated variable for the switching element using the selected one of the first feedback controlled variable and the second feedback controlled variable.

2. The power converter according to claim 1, wherein the first feedback controlled variable, the second controlled variable, and the first electric parameter are a same electrical quantity, and the selector is configured to select one of the first feedback controlled variable and the second feedback controlled variable such that the selected one of first feedback controlled variable and the second feedback controlled variable is closer to the measured value of the first electric parameter.

3. The power converter according to claim 2, wherein:

the first determiner directly determines, from the measured value of the first electric parameter, the first feedback controlled variable that is higher than the measured value of the first electric parameter;

the calculator calculates, based on the measured value of the second electric parameter and the command value for the second electric parameter, the second feedback controlled variable that is higher than the measured value of the first electric parameter; and the selector is configured to select one of the first feedback controlled variable and the second feedback controlled variable such that the selected one of first feedback controlled variable and the second feedback controlled variable is lower than the other thereof.

4. The power converter according to claim 1, wherein:

the first measuring unit is configured to measure, as the measured value of the first electric parameter, one of an input current to the switch circuit as the input power and an output current from the switch circuit as the output power; and the second measuring unit is configured to measure, as the measured value of the second electric parameter, one of an output voltage and the output current from the switch circuit as the output power.

5. The power converter according to claim 1, wherein:

the first electric parameter is one of an input current to the switch circuit as the input power, and an output current from the switch circuit as the output power;

each of the input current and the output current varies with time; and the first measuring unit is configured to measure, as the measured value of the first electric parameter, one of a peak value of the input current to the switch circuit as the input power within a predetermined period, and a peak value of the output current from the switch circuit as the output power within the predetermined period.

6. The power converter according to claim 1, wherein:

the switch circuit is comprised of, as the switching element, a pair of a first switching element and a second switching element connected thereto;

the driver complementarily turns on the first switching element and the second switching element for each predetermined cycle;

the first electric parameter includes at least one of a first input current to the first switching element and a second input current to the second switching element; and the first measuring unit is configured to measure, as the measured value of the first electric parameter, one of:

one of a peak value of the first input current and a peak value of the second input current; and an average value of the peak value of the first input current and the peak value of the second input current.

7. The power converter according to claim 1, wherein:

the first determiner is configured to add a preset value of the first electric parameter to the measured value of the first electric parameter, thus determining the first feedback controlled variable.

8. The power converter according to claim 1, further comprising:

a change quantity calculator that calculates a change quantity of the measured value of at least one of the first electric parameter and the second electric parameter per unit time;

a third determiner that determines whether the change quantity of the measured value of at least one of the first electric parameter and the second electric parameter per unit time is within a predetermined allowable range; and a reducing unit that reduces the manipulated variable for the switching element when it is determined that the change quantity of the measured value of at least one of the first electric parameter and the second electric parameter per unit time is out of the predetermined allowable range.

9. The power converter according to claim 8, wherein:

the reducing unit is configured to subtract, from the manipulated variable for the switching element, a value, and change the value depending on the change quantity of the measured value of at least one of the first electric parameter and the second electric parameter per unit time.

10. The power converter according to claim 1, wherein:

the switch circuit includes a transformer comprised of a primary winding and a secondary winding magnetically coupled thereto;

the switching element is connected to the primary winding; and the first measuring unit is configured to measure, as the measured value of the first electric parameter, one of an input current to the primary winding as the input power and an output current from the secondary winding as the output power.

* * * * *